United States Patent [19]
Nelson

[11] Patent Number: 5,836,601
[45] Date of Patent: Nov. 17, 1998

[54] COLLAPSIBLE GOLF BAG CART WITH SEAT

[75] Inventor: Walter T. Nelson, Ada, Mich.

[73] Assignee: Pingree Products Ltd., Ada, Mich.

[21] Appl. No.: 686,121

[22] Filed: Jul. 23, 1996

[51] Int. Cl.[6] ..................................... B62B 1/12
[52] U.S. Cl. ...................... 280/645; 280/652; 280/47.25; 280/DIG. 6
[58] Field of Search .................................... 280/645, 651, 280/652, 639, 641, 47.24, 47.25, DIG. 6; D34/15

[56] References Cited

U.S. PATENT DOCUMENTS

| D. 302,887 | 8/1989 | Ackerfeldt . | |
|---|---|---|---|
| D. 311,079 | 10/1990 | Blake . | |
| D. 334,451 | 3/1993 | Lindeman | D34/15 |
| 2,438,078 | 3/1948 | Sutphen . | |
| 2,860,888 | 11/1958 | Murcott . | |
| 3,014,760 | 12/1961 | Gard . | |
| 3,506,280 | 4/1970 | Coupe | 280/DIG. 6 |
| 3,709,514 | 1/1973 | Kaczmarek . | |
| 3,997,213 | 12/1976 | Smith et al. | 280/652 |
| 4,262,928 | 4/1981 | Leitzel . | |
| 4,756,539 | 7/1988 | Sneddon . | |
| 4,846,486 | 7/1989 | Hobson | 280/47.25 |
| 5,439,241 | 8/1995 | Nelson . | |
| 5,551,716 | 9/1996 | Kordecki et al. | 280/645 |

FOREIGN PATENT DOCUMENTS 519351  12/1955  Canada ............................ 280/DIG. 6

Primary Examiner—Brian L. Johnson
Assistant Examiner—Min Yu
Attorney, Agent, or Firm—Warner Norcross & Judd

[57] ABSTRACT

A collapsible golf bag cart including a seat and easily moved between collapsed and uncollapsed positions. The cart includes a bag support frame, a wheel support frame and a seat support frame. The support frames are pivotally secured to one another at three distinct joints to allow the cart to collapse and uncollapse in a single motion. One of the joints includes an offset hinge that swings to allow the cart collapse and uncollapse. The seat support frame is of a one-piece construction and rests directly upon the ground when the cart is uncollapsed.

14 Claims, 4 Drawing Sheets

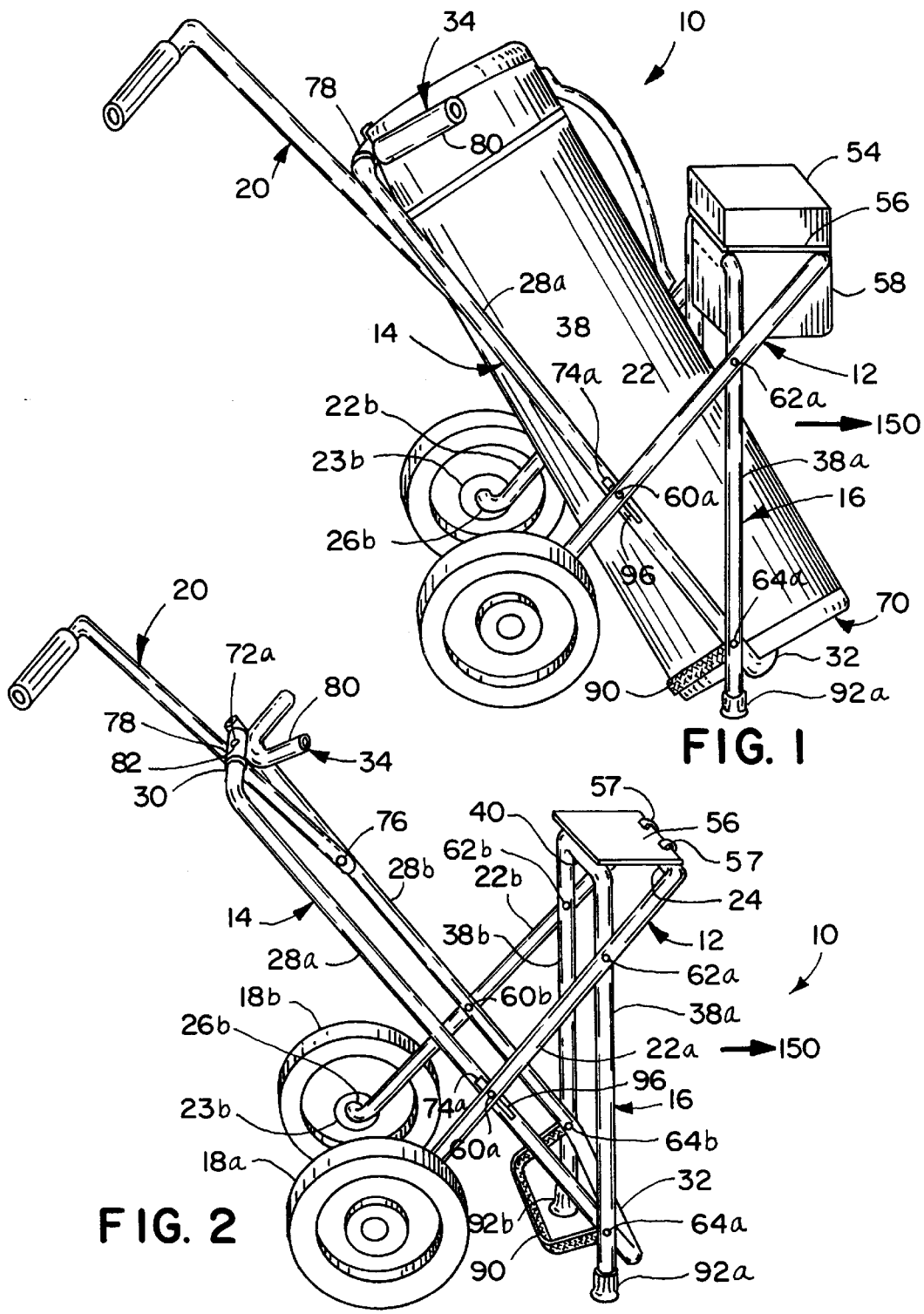

COLLAPSIBLE GOLF BAG CART WITH SEAT

BACKGROUND OF THE INVENTION

The present invention relates to a collapsible golf bag cart having an integral seat.

Golf bag carts are well known and provide an inexpensive way to ease the burden of carrying golf clubs. These carts are available in a wide variety of designs. A collapsible golf club cart with an integral seat is disclosed in U.S. Pat. No. 5,439,241 issued Aug. 8, 1995 to Nelson. This unique and ingenious cart includes pivotally interconnected bag, wheel, and seat support frames. The bag support frame supports the golf club bag and rests upon the ground when the cart is uncollapsed. The wheel support frame is pivotally attached to the bag support frame in a scissor-like fashion. A pair of wheels are attached to the lower end of the wheel support frame and a seat is attached to the upper end of the wheel support frame. The seat support frame is pivotally attached to the lower end of the bag support frame and the upper end of the wheel support frame. The seat support frame cooperates with the wheel support frame to support the seat and includes telescoping side members that extend and retract to allow the cart to expand and collapse. The telescoping side members increase the cost of manufacture of the cart. Also, the telescoping joint can reduce the strength and stability of the seat support frame. In addition, the lower end of the seat support frame is attached to the bag support frame. Forces applied to the seat are transmit to the ground through the joint between the seat support frame and bag support frame. These forces can damage and possibly destroy the joint.

SUMMARY OF THE INVENTION

The aforementioned problems are overcome by the present invention wherein a collapsible golf bag cart is provided with a bag support frame, a wheel support frame, and a seat support frame that are pivotally interconnected at three distinct joints, at least one of which includes an offset hinge. The offset hinge includes linearly offset end portions that are attached to the adjacent support frames. When the cart is collapsed or uncollapsed, the hinge swings to allow the adjacent support frames to pivot and move linearly with respect to each other. The seat support frame is preferably of a one-piece construction and includes a lower end that rests directly upon the ground when the cart is uncollapsed.

The present invention provides a simple and inexpensive collapsible golf bag cart that folds into a compact profile with a single easy motion. The one-piece seat support frame provide a strong an stable cart with relatively low manufacturing costs. Also, the seat is relatively stable because the seat support frame rests directly on the ground.

These and other objects, advantages, and features of the invention will be more readily understood and appreciated by reference to the detailed description of the preferred embodiment and the drawings.

BRIEF DESCRIPTION OF THE DRAWINGS

FIG. 1 is a perspective view of the golf bag cart of the present invention supporting a golf club bag;

FIG. 2 is a perspective view of the golf bag cart with the golf bag removed and without the seat container;

DETAILED DESCRIPTION OF THE PREFERRED EMBODIMENT

Figure 3:
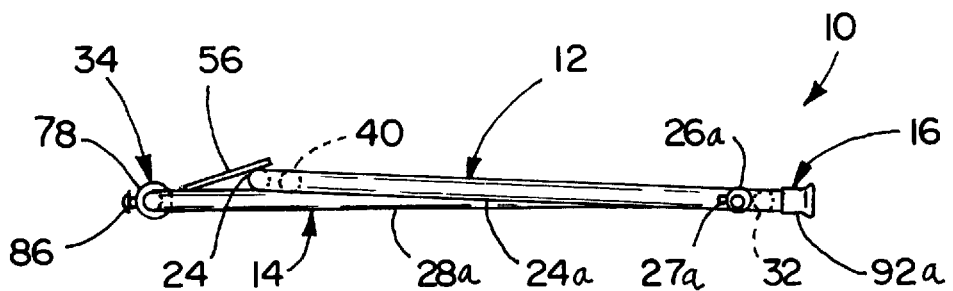
FIG. 3 is a side elevational view of the golf bag cart collapsed with the wheels removed.

The golf bag cart of the present invention is illustrated in the drawings and generally designated 10. As perhaps best illustrated in FIGS. 1 and 2, the golf bag cart 10 includes a wheel support frame 12, a bag support frame 14, a seat support frame 16, a pair of wheels 18a–b, and a handle 20. The direction denoted by arrow 150 will be herein referred to as forward.

Figure 10:
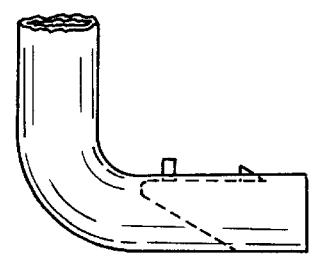
FIG. 10 is a top plan view of a lower portion of the wheel support frame showing an alternative wheel attachment arrangement.

The wheel support frame 12 is generally "U" shaped and includes a pair of spaced apart side members 22a–b and a bight member 24 extending between the upper ends of the pair of side members 22a–b. A pair of elbows 26a–b extend outwardly from the lower end of each side member 22a–b, respectively (see FIG. 4) to rotatably support the wheels 18a–b. A snap button 27a–b is mounted within each elbow to detachably secured the wheels 18a–b to the elbows 26a–b. A collar 23a–b is mounted to each elbow 26a–b to limit inward movement of wheels. Alternatively, collars 23a–b and snap buttons 27a–b can be replaced latch-type snap buttons 23 (See FIG. 10).

Figure 9:
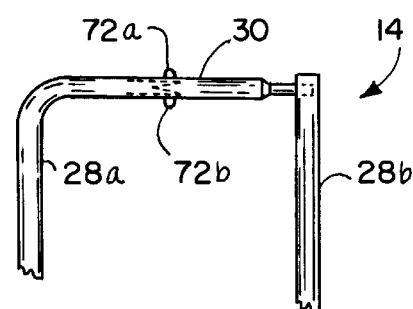
FIG. 9 is a top plan view of an upper portion of the bag support frame with the bag support member removed.

The bag support frame 14 is generally rectangular and includes a pair of spaced apart side members 28a–b, an upper cross member 30, and a lower cross member 32. The upper 30 and lower 32 cross members extend between the upper and lower ends of the side members 28a–b, respectively. The lower cross member 32 supports the bottom of the golf bag 70, preferably well above the ground. The bag support frame 14 is preferably manufactured from a single length of tubing that is bent to form the side members 28a–b and cross members 30 and 32. Opposite ends of the tube can be secured by bolting, welding, or other conventional methods. A rectangular stop 74a–b is mounted to a central portion of each side member 28a–b to limit uncollapse of the cart 10. The stops 74a–b are bolted, screwed, welded or otherwise secured to the side members 28a–b. A pair of opposed snap buttons 72a–b are mounted within the upper cross member 30 (See FIG. 9). Also, a strap 90 extends between the bottom ends of the side members 28a–b to support the bottom side wall of the golf bag 70. The strap 90 is preferably riveted to the side members 28a–b.

A bag support member 34 is fitted over and pivotally secured to the upper cross member 30. The bag support member 34 pivots between extended and collapsed positions. In the collapsed position, the bag support member 34 lies substantially flat with (i.e. in the plane of) the bag support frame to provide a compact profile for the collapsed cart 10. The bag support member 34 pivots upward and locks into the extended position to support the upper side wall of the golf club bag 70. The bag support member includes a sleeve 78 that is slidably fitted over the upper cross member 30 and a bag bracket 80 that receives the golf bag 70. The sleeve 78 defines a hole 82 for receiving snap button 72a and a ninety degree slot 84 for receiving snap button 72b. Snap button 72b prevents the bag support member 34 from moving linearly with respect to the upper cross member 30 while snap button 72a locks the bag support member 34 in the extended position. The sleeve 78 defines a "T"-shaped slot 86 that receives the rivet head 88 to secure the handle 20 in the extended position as described below.

Figure 5:
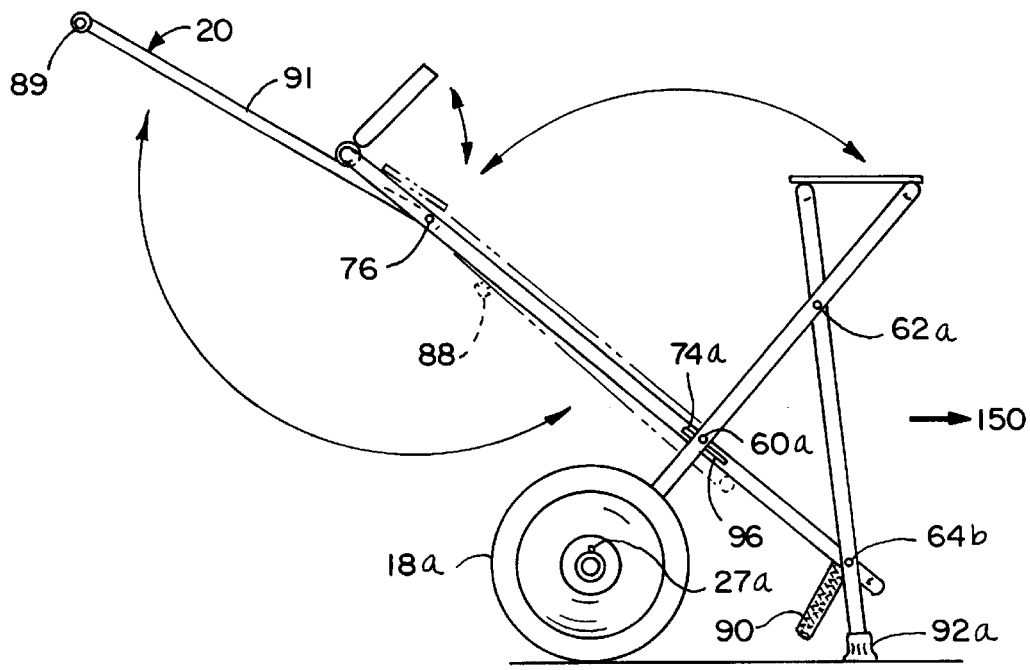
FIG. 5 is a side elevational view of the cart showing the collapsed positions in phantom lines.
Figure 7:
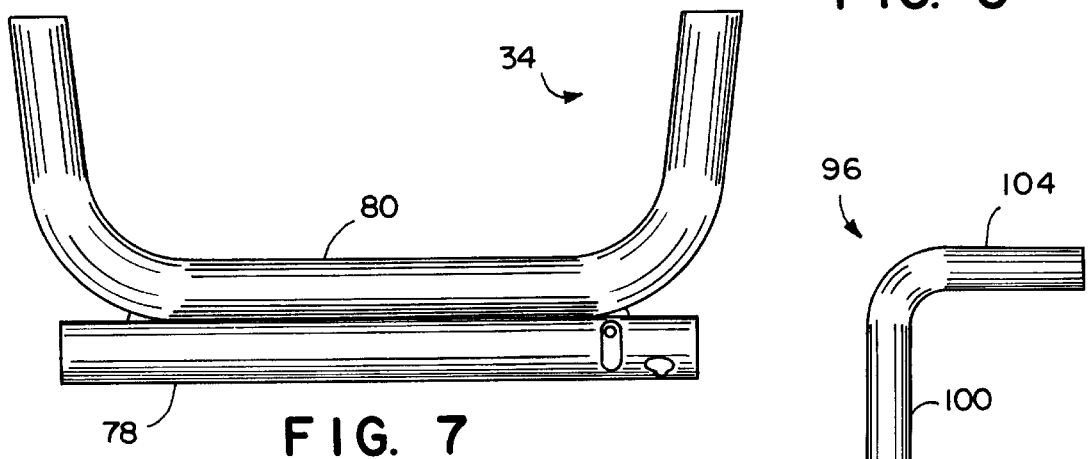
FIG. 7 is a top plan view of the bag support member.
Figure 8:
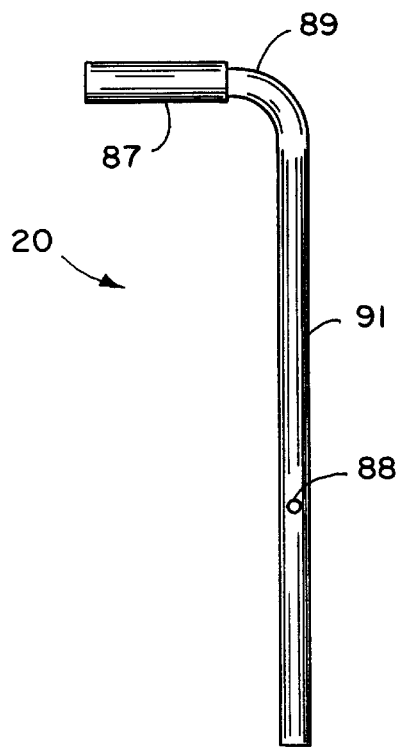
FIG. 8 is a top plan view of the handle.

The handle 20 is generally "L" shaped (See FIG. 8) and pivots between a folded position and an extended position (See FIG. 5). The handle 20 includes a short leg 89 that receives a cushion 87 or grip tape, and a long leg 91 that is pivotally attached to side member 28b at joint 76. The handle 20 includes a stepped rivet 88 adapted to fit within slot 86 to support the handle 20 in the open position. Alternatively, the handle 20 can be telescopically received within the hollow side member 28b (not shown). A locking nut (not shown), as is well known in the art, can be affixed to the upper end of the side member 28b to secure the telescoping handle 20 in the desired position.

The seat support frame 16 is generally "U" shaped and includes a bight member 40 extending between a pair of side members 38a–b. The side members 38a–b terminate at rubber feet 92a–b that engage the ground when the cart 10 is opened. The bight member 40 cooperates with the bight member 24 of the wheel support frame to support the seat 54 and the container 58. The seat 54 is affixed to the bight member 24 of the wheel support frame and extends over the bight member 40 of the seat support frame. In a preferred embodiment, the seat 54 includes a hinged lid 56 which opens to provide access to a container 58 suspended below. The lid 56 can be secured to the bight member 24 of the wheel support frame by conventional cable ties 57. The container 58 is attached to both bight members 24 and 40 and can be fabricated from or lined with an insulating material to maintain the thermal characteristics of items placed therein. In addition, the container 58 can include any number of pouches, trays or other subcompartments for storing golf items such as tees, bails, divot wrenches, pencils, gloves and scorecards.

Figure 4:
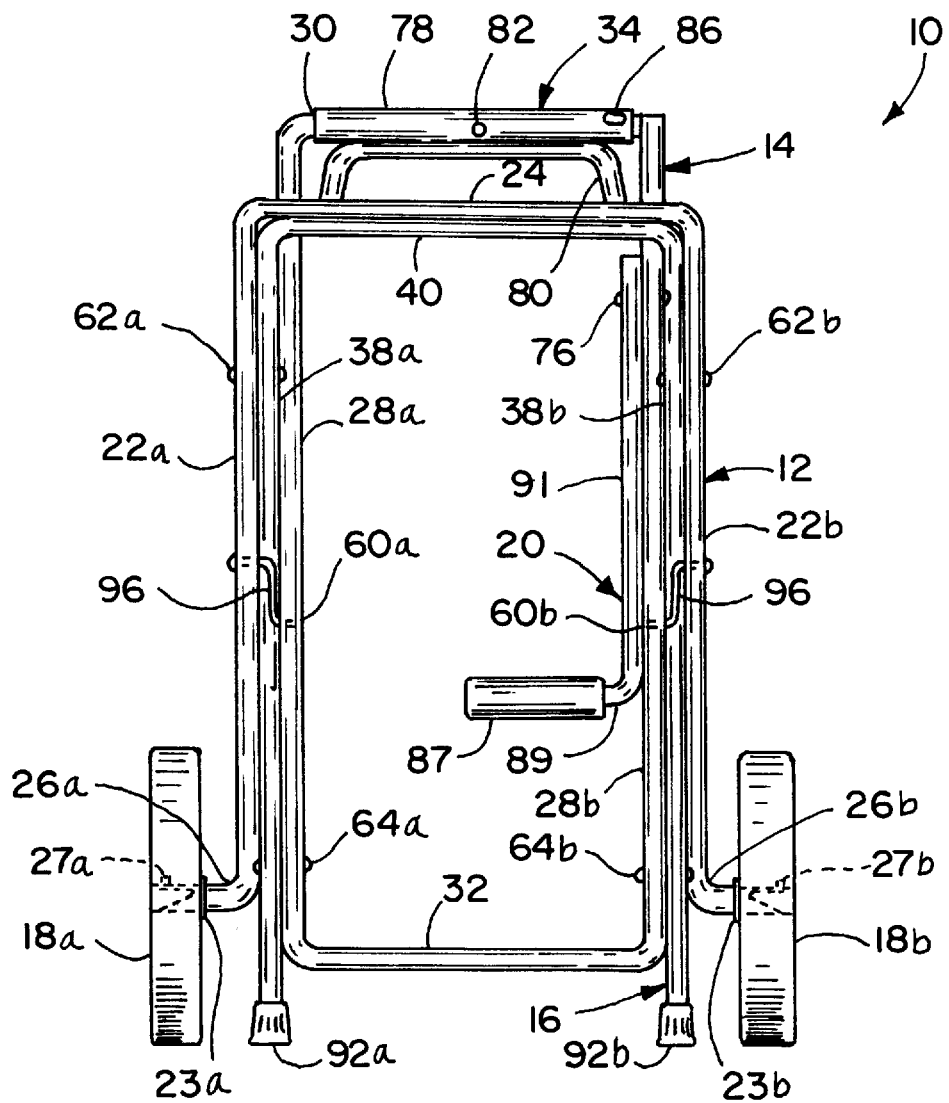
FIG. 4 is a top plan view of the golf bag cart collapsed.
Figure 6:
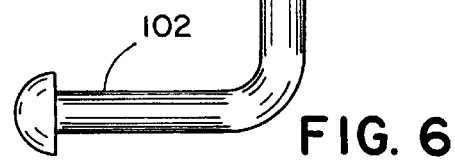
FIG. 6 is a top plan view of the offset hinge.

As best shown in FIGS. 4 and 5, a central portion of each wheel support frame side member 22a–b is pivotally secured to a central portion of the corresponding bag support frame side member 28a–b by an offset hinge 96 to form a first set of joints or pivots points 60a–b. The offset hinge 96 (See FIG. 6) includes a central portion 100 extending between a pair of linearly offset end portions 102 and 104. The first end portion 102 is pivotally connected to the wheel support frame and the second end portion 104 is pivotally connected to the bag support frame. The offset hinges 96 allow the two frames to move linearly with respect to each other when the cart 10 is collapsed and uncollapsed. Also, a central portion of each seat support frame side member 38a–b is pivotally secured to a central portion of each wheel support frame side member 22a–b to form a second set of joints or pivot points 62a–b. These joints 62a–b are not offset. Finally, a lower portion of each bag support frame side member 28a–b is pivotally secured to a lower portion of the corresponding seat support frame side member 38a–b to form a third set of joints or pivot points 64a–b. These joints 64a–b are not offset. While shown at joints 60a–b, the offset hinge 96 can be located at any set of joints 60a–b, 62a–b, or 64a–b.

In operation, the golf bag cart 10 is easily moved or transferred between collapsed and uncollapsed positions or configurations (See FIGS. 2 and 3) by pivoting wheel support frame 12 and bag support frame 14 relative to one another about the set of offset joints 60a–b. In the uncollapsed position, the cart 10 supports a golf club bag 70, which is seated down between the bag support frame side members 28a–b with its bottom resting upon the bag support frame lower cross member 32. The upper side wall of the bag 70 is supported by bag support member 34 and the lower side wall of the bag 70 is supported by the strap 90. In this manner, the bag 70 is securely supported within the cart 10 without the need for additional securing means, such as a bag strap.

In order to collapse the cart 10, the upper portion of the bag support frame 14 is drawn toward the upper portion of the wheel support frame 12 thereby pivoting frames 12 and 14 at the set of offset joints 60a–b in a scissor-like fashion. The offset hinges 96 swing to allow the bag support frame 14 and wheel support frame 12 to move linearly with respect to one another. The pivoting motion also causes the seat support frame 16 to pivot in relation to the wheel support frame 12 at the second set of joints 62a–b, and in relation to the bag support frame 14 at the third set of joints 64a–b. For a more compact profile, seat 54 and lid 56 can be folded upward and wheels 18a–b can be detached from the cart 10 at elbows 26a–b. In addition, the bag support member 34 and handle 20 can be rotated downward to lie parallel to the bag support frame side members 28a–b (See FIG. 3). The handle 20 is released from the extended position by rotating the bag support member 34 to disengage the stepped rivet 86 from the "T"-shaped slot 88.

The cart 10 is uncollapsed by performing the reverse motion. The upper portion of the bag support frame 14 is drawn away from the upper portion of the wheel support frame 12 such that the two frames 12 and 14 pivot at the first set of joints 60a–b. This pivoting motion causes the seat support frame 16 to pivot in relation to the wheel support frame 12 at the second set of joints 62a–b and in relation to the bag support frame 14 at the third set of joints 64a–b. Simultaneously, the offset hinges 96 swing to allow the bag support frame 14 and wheel support frame 12 to move linearly with respect to one another. The handle 20 is swung up about joint 27 into the extended position. Also, the bag support member 34 is rotated upward into the uncollapsed position to receive and support the upper side wall of the golf club bag 70. The snap-buttons 72a and 72b are received within hole 82 and slot 84 to secure the bag support member 34 in position. As the bag support member 34 is rotated, the stepped rivet 86 is fitted within the "T" shaped slot 88 to secure the handle 20 in the extended position.

The above description is that of a preferred embodiment of the invention. Various alterations and changes can be made without departing from the spirit and broader aspects of the invention as defined in the claims, which are to be interpreted in accordance with the principles of patent law, including the doctrine of equivalents.

The embodiments of the invention in which an exclusive property or privilege is claimed are defined as follows:

1. A collapsible golf club bag cart movable between collapsed and uncollapsed configurations, said cart comprising:

a wheel support frame;

a bag support frame having dual spaced apart side members for seating a golf club bag therebetween, said bag support frame being pivotally secured to said wheel support frame at a first joint;

a seat support frame pivotally secured to said wheel support frame at a second joint and to said bag support frame at a third joint;

a seat hingedly connected to at least one of said wheel support frame and said seat support frame;

a pair of wheels secured to said wheel support frame; and an offset hinge located at one of said joints, said offset hinge having a first end portion secured to one of said frames, a second end portion secured to another of said frames, and a center portion extending between and linearly offsetting said first and second end portions, whereby said offset hinge swings to allow the cart to move between the collapsed and uncollapsed configurations.

2. The collapsible golf club bag cart of claim 1, wherein said center portion of said offset hinge extends substantially perpendicularly to said first end portion and said second end portion.

3. The collapsible golf club bag cart of claim 2, further comprising a handle pivotally secured to said bag support frame for movement between folded and extended positions.

4. The collapsible golf club bag cart of claim 3, further comprising a container suspended below said seat, said container secured to at least one of said wheel support frame and said seat support frame.

5. The collapsible golf club bag cart of claim 4, further comprising a bag support member pivotal between a first collapsed position and a second extended position secured to said bag support frame.

6. The collapsible golf club bag cart of claim 5, wherein said bag support member includes a handle securing means, for securing said handle in the extended position.

7. The collapsible golf club bag cart of claim 6, wherein said bag support member defines a slot, said handle securing means including a stepped rivet adapted to fit within said slot when said handle and said bag support frame are in the extended position.

8. A collapsible golf club bag cart for supporting and carrying a golf club bag, comprising:

a wheel support frame having upper, lower and central portions, said lower portion of said wheel support frame supported upon a pair of wheels;

a bag support frame having upper, lower and central portions, said central portion of said bag support being pivotally secured to said central portion of said wheel support frame at a first joint, said bag support frame including dual spaced apart side members;

a seat support frame having upper, lower and central portions, said central portion of said seat support pivotally secured to said central portion of said wheel support frame at a second joint and said lower portion of said seat support frame pivotally secured to said lower portions of said bag support frame at a third joint; and an offset hinge pivotally interconnecting said frames at least one of said joints, said offset hinge including a first end portion and a second end portion, said first and second end portions linearly offset from each other, said first end portion pivotally secured to a first of said frames and said second end pivotally secured to a second of said frames, wherein said offset hinge swings to permit said first and second frames to move with respect to each other when the cart is collapsed or uncollapsed.

9. The collapsible golf club bag cart of claim 8, further comprising a seat affixed to said upper portion of said wheel support frame.

10. The collapsible golf club bag cart of claim 9, further comprising a handle affixed to said bag support frame.

11. The collapsible golf club bag cart of claim 10, wherein said wheels are detachable from said wheel support frame.

12. The collapsible golf club bag cart of claim 11, further comprising a container suspended below said seat.

13. The collapsible golf club bag cart of claim 12, wherein said seat is hingedly affixed to said upper portion of said wheel support frame such that said seat can be opened to provide access to the interior of said container.

14. The collapsible golf club bag cart of claim 13, wherein said container includes a cooler means.

* * * * *